United States Patent Office 3,726,856
Patented Apr. 10, 1973

3,726,856
PROCESS FOR PREPARING ERYTHROMYCIN-2'-AMIDES
Anthony A. Sinkula, Kalamazoo, Mich., assignor to The Upjohn Company, Kalamazoo, Mich.
No Drawing. Filed May 13, 1971, Ser. No. 143,199
Int. Cl. C07c 129/18
U.S. Cl. 260—210 E          7 Claims

ABSTRACT OF THE DISCLOSURE

An improved chemical process for preparing erythromycin amides by reaction of erythromycin with a suitable amido carboxylic acid in the presence of a substituted chloroformate or a substituted bromoformate and an acid acceptor. Erythromycin amides are superior tasting erythromycin compounds possessing erythromycin antibacterial activities and the same uses as erythromycin.

BRIEF SUMMARY OF THE INVENTION

Erythromycin is a well known antibiotic produced by the organism *Streptomyces erythreus* as described in U.S. Pat. No. 2,653,899. In the erythromycin fermentation, as described in U.S. 2,653,899, there are produced several closely related antibiotic materials which are designated erythromycin A, erythromycin B, and erythromycin C. Erythromycin A is distinguishable from erythromycins B and C by having a higher degree of activity against susceptible bacteria. Thus, erythromycin A is preferred when the use of an erythromycin antibiotic is indicated. U.S. Pats. Nos. 2,823,203 and 2,833,696 disclose processes for the preparation of erythromycin A.

A prior art process for preparing erythromycin amides involves first converting erythromycin A to a hemiester, and then reacting this compound with an amine in the presence of a dehydrating agent to form erythromycin A amide. The process of the subject invention is an improvement over this prior art process for the reasons following: the formation of erythromycin amides proceeds at a more rapid rate than the prior art process; the invention process produces less impurities and odoriferous side products than the prior art process; the invention process proceeds without discoloration of the reaction mixture, thus simplifying purification; and the invention process can be carried out with a minimum waste of erythromycin base starting material. The invention process comprises the reaction of erythromycin base with an amido carboxylic acid in the presence of a substituted chloroformate or substituted bromoformate and an acid acceptor, for example, a tertiary amine.

DETAILED DESCRIPTION

The process of the subject invention can be used to prepare erythromycin amides having the following structure:

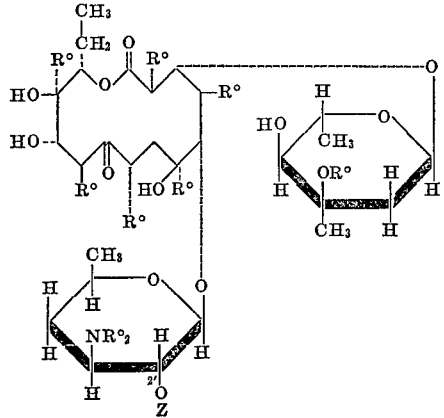

(I)

wherein

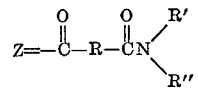

$R° = CH_3$
R = Substituted and unsubstituted aliphatic of from 2 to 8 carbon atoms, inclusive; or aromatic of from 6 to 12 carbon atoms, inclusive; or alicyclic of from 4 to 7 carbon atoms, inclusive.
R' and R" = H, alkyl of from 1 to 20 carbon atoms, inclusive, and isomeric forms thereof; cycloalkyl of 3 to 8 carbon atoms, inclusive; and aralkyl of not more than 12 carbon atoms.

The erythromycin amides are produced in the invention process by reacting erythromycin base with an amido carboxylic acid in the presence of a substituted chloroformate or a substituted bromoformate and an acid acceptor, for example, a tertiary amine. The reaction can be shown as follows:

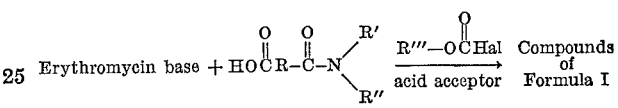

wherein R, R' and R" are as defined above, R''' is alkyl of from 1 to 20 carbon atoms, inclusive, and Hal is chloro or bromo.

Suitable acids for the above reaction can be obtained by the reaction of an amine with a cyclic anhydride to form the amido carboxylic acid. The reaction can be shown as follows:

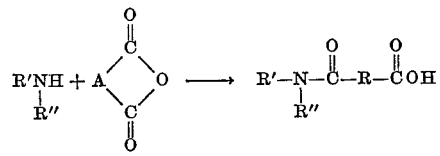

wherein A = saturated and unsaturated aliphatic of from 4 to 10 carbon atoms, inclusive; or aromatic of from 8 to 14 carbon atoms, inclusive; or alicyclic of from 6 to 9 carbon atoms, inclusive; R, R' and R" are as defined above. Examples of aliphatic are ethenylene; substituted ethenylene wherein the added group is a methyl, chloro, or bromo group; ethylene; substituted ethylene wherein the added group is a phenyl or methylene group; alkyl of from 1 to 12 carbon atoms, including dodecyl; propylene; substituted propylene wherein the added group is an alkyl of from 1 to 3 carbon atoms, inclusive; hexamethylene and octamethylene.

Examples of aromatic are phenylene ($C_6H_4$); biphenylene 2,2'-diyl and naphthylene 1,8-diyl, substituted phenylene wherein the added group can be a halogen, for example, Cl, Br, I, and F, or an alkyl of from 1 to 3 carbon atoms, inclusive, or a carboxy, or nitro; substituted biphenylene 2.2'-diyl wherein the added group can be a halogen, as described above, or an alkyl of from 1 to 3 carbon atoms, inclusive, or a carboxy or a nitro, or a sulfonyl, or a sulfamoyl, or a sulfino, or a sulfo; substituted naphthylene 1,8-diyl wherein the added group can be as described above for biphenylene 2,2'-diyl, and pyridine-diyl.

Examples of alicyclic are cyclobutenylene, cyclohexenylene, cyclopentenylene, and norbornylene.

Suitable acid anhydrides which can be used to prepare the amido carboxylic acids are citraconic (methylmaleic); α-methylglutaric; hexahydroisophthalic (cis); β-methyl-β-ethylglutaric; α,α-dimethylsuccinic (unsym.

dimethylsuccinic); hexahydrophthalic (cis); DL-methylsuccinic; β-methylglutaric; α,β-dimethylsuccinic (trans); DL-phenylsuccinic; glutaric; maleic; suberic (dimer)(octanedioic); itaconic (methylenesuccinic); sebacic (dimer) (decanedioic); α,β-dimethylsuccinic (cis); 3,5-dichlorophthalic; 4-methylphthalic; 4-chlorophthalic; DL-benzylsuccinic; β-phenylglutaric; 4-bromophthalic; 3-methylphthalic; 4-nitrophthalic; succinic; 3-chlorophthalic; 4-iodophthalic; 3,4 - dimethylphthalic; 3 - bromophthalic; phthalic; DL-hexahydrophthalic acid (trans); homophthalic (2-carboxyphenylacetic); 3-iodophthalic; 3-nitrophthalic; 3,5-dinitrophthalic; 4,5-dichlorophthalic; 3,6-dichlorophthalic; 3,4-diiodophthalic; 4,5-dimethylphthalic; 2,2'-diphenic; tetrachlorophthalic; 1,8-naphthalene dicarboxylic; tetrabromophthalic; and tetraiodophthalic.

The above reaction to make the amido carboxylic acids can be conducted by procedures well known in the art, for example, procedures disclosed in German Pat. 859,304.

The substituted chloroformate or substituted bromoformate which is used in the process to make compounds of Formula I can be represented by the following formula:

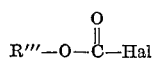

wherein R''' is alkyl of from 1 to 20 carbon atoms, inclusive, and Hal is chloro or bromo. Ethylchloroformate and isobutylchloroformate are preferred.

The substituted chloroformate or substituted bromoformate, and acid acceptor used in the subject invention can range from 0.75 to 1.5 molar times the amido carboxylic acid with equal molar amounts being preferred.

The acid acceptor which is employed in the reaction to make compounds of Formula I can be a tertiary amine substituted by an alkyl of from 1 to 8 carbon atoms, inclusive, and isomeric forms thereof, or alkyl substituted piperidines wherein the alkyl is from 1 to 8 carbon atoms, inclusive, and isomeric forms thereof, and dialkyl aniline wherein the alkyl can be from 1 to 8 carbon atoms, inclusive, and isomeric forms thereof. The alkyl substitutions need not be the same alkyl groups except for the aniline substitutions.

Further, with regard to the process for preparing the compounds of Formula I, any anhydrous solvent which will solubilize the reactants can be used in the reaction, for example chlorinated lower-alkanes, for example, methylene chloride, chloroform, ethylene dichloride, and the like; lower-alkanones, for example, acetone, methyl ethyl ketone, isopropyl butyl ketone, and the like; and acetonitrile.

The reaction to obtain the compounds of Formula I can be run at a temperature of from about −30° C. to about 30° C., with room temperature, or about 27° C. being preferred. The lower temperatures minimize the formation of side products in the reaction. The reaction is generally complete in about 12 to 24 hours.

The following examples are illustrative of the process of the present invention but are not to be construed as limiting.

EXAMPLE 1

Preparation of N-dodecyl glutaramic acid

Glutaric anhydride (11.41 g., 0.01 mole) is dissolved in 50 ml. of acetone. n-Dodecylamine (16.68 g., 0.009 mole) is dissolved in 150 ml. of acetone and warmed to 40° C. The two solutions are thoroughly mixed and allowed to stand at room temperature for one hour. The resulting crystals are collected and dried; yield, 20 g. of pure n-dodecyl glutaramic acid.

Calc'd for $C_{17}H_{33}NO_3$ (percent): C, 68.17; H, 11.11; N, 4.70; Eq. wt., 299.5; $H_2O$, 0. Found (percent): Corrected for 1.05% $H_2O$. C, 68.13; H, 11.03; N, 4.46; Eq. wt., 299; $H_2O$, 1.05.

EXAMPLE 2

Preparation of erythromycin 2'-dodecyl glutaramide

N-dodecyl glutaramic acid (15 g., 0.05 mole) is dissolved in 750 ml. of chloroform and the solution is cooled to −10° C. To this solution is added 6.8 g. (6.5 ml., 0.05 mole) of i-butylchloroformate and 5.05 g. (7 ml., 0.05 mole) of triethylamine. The mixture is stirred well and to this mixture is added dropwise a solution of 36.65 g. (0.05 mole) of erythromycin A base in 250 ml. of chloroform. During the addition, the temperature is maintained at −10° C. The reaction mixture is warmed to room temperature and stirred for 24 hours. The solvent is then removed in vacuo and the resulting residue dissolved in anhydrous acetone. The resulting precipitate of triethylamine hydrochloride is filtered and the solvent again removed in vacuo to give crude erythromycin-2'-dodecyl glutaramide.

62 g. of crude erythromycin-2'-dodecyl glutaramide, synthesized by the above procedure, is dissolved in 150 ml. of anhydrous acetone. This solution is then introduced into a 183 x 10 cm. glass column containing 6 kg. of previously treated silica gel (0.05–0.2 mm.) for column chromatography. [The silica gel is treated by suspending the same in anhydrous acetone and the fines decanted. This procedure is repeated twice. The gel is then washed two times with enough chloroform to wet the entire silica gel powder mix, dried by vacuum filtration, and suspended in anhydrous acetone prior to use.] The material is eluted from the column with anhydrous acetone and the column run at a flow rate of approximately 17 ml./minute. One-thousand ml. cuts are collected and fractions 7–12 are collected, pooled and the solvent removed in vacuo; yield, 30 g. of pure white erythromycin-2'-dodecyl glutaramide.

Calc'd for $C_{54}H_{98}N_2O_{15}$ (percent): C, 63.88; H, 9.73; N, 2.76. Found (percent): Not corrected for 0.53% $H_2O$. C, 63.49; H, 9.53; N, 3.06.

EXAMPLE 3

Preparation of N-dodecyl succinamic acid

Succinic anhydride (31 g., 0.31 mole) is dissolved in 100 ml. of acetone. n-Dodecylamine (55.5 g., 0.30 mole) is dissolved in 500 ml. of acetone and warmed to 40° C. The two solutions are thoroughly mixed and a precipitate forms immediately. The suspension is stirred at room temperature for 2 hours, placed in a refrigerator for 40 minutes, and filtered; yield, 80 g. (93.6%) of pure N-dodecyl succinamic acid.

Calc'd for $C_{16}H_{31}NO_3$ (percent): C, 67.33; H, 10.95; N, 4.91; mol. wt., 285; $H_2O$, 0. Found (percent): Corrected for 0.28% $H_2O$. C, 67.55; H, 11.00; N, 4.86; mol. wt., 285.

EXAMPLE 4

Preparation of erythromycin-2'-dodecyl succinamide 2.85 g. (0.01 mole) of N-dodecyl succinamic acid is dissolved in 175 ml. of chloroform and cooled to −10° C. To this solution is added 1.36 g. of i-butylchloroformate and 1.01 g. of triethylamine, and the mixture stirred well. To this mixture is added dropwise a solution of 7.33 g. (0.01 mole) of erythromycin A base in 50 ml. of chloroform. During addition, the temperature of the reaction mixture is maintained at −10° C. The reaction mixture is warmed to room temperature and stirred for 24 hours. The solvent is removed in vacuo. The resulting powder is dissolved in acetone, filtered, and placed on a column containing 600 g. of previously treated silica gel* (0.05–8.2 mm.) for column chromatography. The column is eluted with anhydrous acetone at a rate of

---

*This silica gel, prior to placement on the column, is washed once with chloroform and once with anhydrous acetone. The gel is then suspended in anhydrous acetone prior to use.

4–5 ml./minute. The solvent fractions containing pure erythromycin-2'-dodecyl succinamide are pooled and the solvent removed in vacuo.

Calc'd for $C_{53}H_{96}N_2O_{15}$ (percent): C, 63.57; H, 9.66; N, 2.80; $H_2O$, 0. Found (percent): Corrected for 0.95% $H_2O$. C, 63.10; H, 9.69; N, 2.72.

EXAMPLE 5

By substituting the glutaric anhydride in Example 1 by the following anhydrides, there are obtained the corresponding amido carboxylic acids: citraconic (methylmaleic); hexahydroisophthalic (cis); α,α-dimethylsuccinic (unsym.dimethylsuccinic); hexahydrophthalic (cis); DL-methylsuccinic; α,β-dimethylsuccinic (trans); DL-phenylsuccinic; maleic; suberic (dimer) (octanedioic); itaconic (methylenesuccinic); sebacic (dimer)(decanedioic); α,β-dimethylsuccinic (cis); 3,5-dichlorophthalic; 4-methylphthalic; 4-chlorophthalic; DL-benzylsuccinic; 4-bromophthalic; 3-methylphthalic; 4-nitrophthalic; 3-chlorophthalic; 4-iodophthalic; 3,4-dimethylphthalic; 3-bromophthalic; phthalic; DL-hexahydrophthalic acid (trans); homophthalic (2-carboxyphenylacetic); 3-iodophthalic; 3-nitrophthalic; 3,5-dinitrophthalic; 4,5-dichlorophthalic; 3,6-dichlorophthalic; 3,4-diiodophthalic; 4,5-dimethylphthalic; 2,2'-diphenic; tetrachlorophthalic; 1,8-naphthalene dicarboxylic; tetrabromophthalic; and tetraiodophthalic.

EXAMPLE 6

By substituting N-dodecyl glutaramic acid in Example 2 by the amido carboxylic acids obtained in Example 5, there are obtained the corresponding erythromycin-2'-amides.

Examples of alkyl of from 1 to 20 carbon atoms are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl, and the isomeric forms thereof.

What is claimed is:

1. An improved process for preparing erythromycin-2'-amides having the following structure:

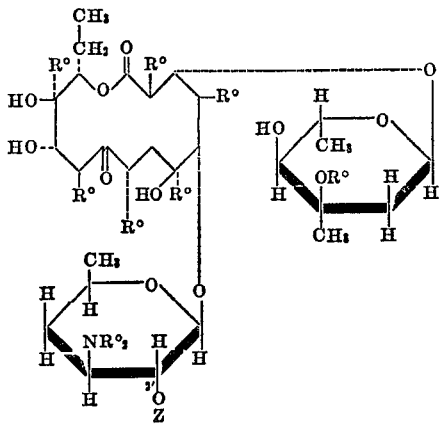

wherein

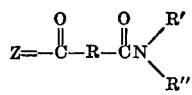

$R^o = CH_3$

R = substituted and unsubstituted aliphatic of from 2 to 8 carbon atoms, inclusive, selected from the group consisting of ethenylene; substituted ethenylene wherein the added group is a methyl, chloro, or bromo group; ethylene; substituted ethylene wherein the added group is a phenyl or methylene group; alkyl of from 1 to 12 carbon atoms; propylene; substituted propylene wherein the added group is an alkyl of from 1 to 3 carbon atoms, inclusive; hexamethylene and octamethylene; or aromatic of from 6 to 12 carbon atoms, inclusive; or alicyclic of from 4 to 7 carbon atoms, inclusive;

R' and R" = H, alkyl of from 1 to 20 carbon atoms, inclusive, and isomeric forms thereof; cycloalkyl of 3 to 8 carbon atoms, inclusive; and aralkyl of not more than 12 carbon atoms;

which comprises reacting erythromycin with an amido carboxylic acid having the following structure:

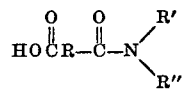

wherein R, R' and R" are as defined above, in the presence of a substituted chloroformate or a substituted bromoformate, wherein said substitution consists of alkyl of from 1–20 carbon atoms, inclusive, and an acid acceptor at a temperature of from about −30° C. to about +30° C.

2. A process, according to claim 1, for preparing erythromycin-2'-dodecyl glutaramide which comprises reacting erythromycin with N-dodecyl glutaramic acid in the presence of a substituted chloroformate or a substituted bromoformate and an acid acceptor.

3. A process, according to claim 2, wherein i-butylchloroformate is the substituted chloroformate.

4. A process, according to claim 2, wherein triethylamine is used as the acid acceptor.

5. A process, according to claim 1, for preparing erythromycin-2'-dodecyl succinamide which comprises reacting erythromycin with N-dodecyl succinamic acid in the presence of a substituted chloroformate or a substituted bromoformate and an acid acceptor.

6. A process, according to claim 5, wherein i-butylchloroformate is the substituted chloroformate.

7. A process, according to claim 5, wherein triethylamine is used as the acid acceptor.

References Cited

UNITED STATES PATENTS 3,597,415   8/1971   Sinkula   260—210 E

ELBERT L. ROBERTS, Primary Examiner

J. R. BROWN, Assistant Examiner